United States Patent
Fong et al.

(10) Patent No.: US 7,347,575 B2
(45) Date of Patent: Mar. 25, 2008

(54) VEHICLE GAUGE WITH EMBEDDED DRIVER INFORMATION

(75) Inventors: Ching Fong, Canton, MI (US); Sanjiv Venkatram, Canton, MI (US); Zinoviy Kelman, Bloomfield Hills, MI (US); Joseph Pasek, Northville, MI (US); Brian P Demhlow, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 70 days.

(21) Appl. No.: 11/157,013

(22) Filed: Jun. 20, 2005

(65) Prior Publication Data

US 2006/0012971 A1     Jan. 19, 2006

Related U.S. Application Data

(60) Provisional application No. 60/587,539, filed on Jul. 13, 2004.

(51) Int. Cl.
    *G01D 11/28*     (2006.01)
    *B60Q 3/04*     (2006.01)

(52) U.S. Cl. .......................... 362/23; 362/27; 362/29; 362/489; 116/284; 116/288

(58) Field of Classification Search ............... 116/62.1, 116/284, 300, 48, 285–288; 362/28, 29, 362/262, 546, 489, 27; 73/499, 866.3; 340/688
See application file for complete search history.

(56) References Cited

U.S. PATENT DOCUMENTS

| | | | |
|---|---|---|---|
| 2,108,342 A | * | 2/1938 | Le Fevre ................... 116/62.1 |
| 2,496,488 A | | 2/1950 | Ohman |
| 3,150,634 A | | 9/1964 | Rosen |
| 3,389,678 A | | 6/1968 | Fenwick |
| 3,490,226 A | | 1/1970 | Anderson et al. |
| 3,621,811 A | | 11/1971 | Hill, Jr. |

(Continued)

FOREIGN PATENT DOCUMENTS

DE     4321146 A1   *   1/1995

(Continued)

OTHER PUBLICATIONS

Stitch, Andreas. "LEDs, New Light Sources for Display Backlighting," Feb. 2, 2004, pp. 1-9.

*Primary Examiner*—John Anthony Ward
*Assistant Examiner*—David R Crowe
(74) *Attorney, Agent, or Firm*—Harness, Dickey & Pierce, P.L.C.

(57) ABSTRACT

A gauge having a housing, a light source disposed in the housing, a bezel, a display and a pointer. The display is coupled to the housing and includes a display surface that is visible through an opening in the bezel. The display is spaced rearwardly of the bezel to define a light transmitting aperture. The pointer is movably mounted to the housing and includes a pointer end that is disposed on a side of the bezel opposite the light transmitting aperture. A first portion of the light produced by the light source can be employed to back-illuminate the display surface, while a second portion of the light produced by the light source can be collected by the pointer and employed to illuminate the pointer end.

18 Claims, 5 Drawing Sheets

U.S. PATENT DOCUMENTS

| | | | |
|---|---|---|---|
| 3,803,831 A | 4/1974 | Horzick | |
| 4,409,827 A | 10/1983 | Overs | |
| 4,630,895 A | 12/1986 | Abdala, Jr. et al. | |
| 4,875,433 A | 10/1989 | Tsukamoto | |
| 4,911,096 A | 3/1990 | Munakata | |
| 5,079,470 A | 1/1992 | Kasuga et al. | |
| 5,201,277 A * | 4/1993 | Aoki et al. | 116/286 |
| 5,245,944 A | 9/1993 | Yamamoto | |
| 5,257,167 A | 10/1993 | Clem | |
| 6,016,038 A | 1/2000 | Mueller et al. | |
| 6,088,300 A | 7/2000 | Nakajima et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,302,522 B1 | 10/2001 | Rumph et al. | |
| 6,302,551 B1 * | 10/2001 | Matumoto | 362/27 |
| 6,340,868 B1 | 1/2002 | Lys et al. | |
| 6,382,127 B2 * | 5/2002 | Wehner | 116/284 |
| 6,408,783 B1 | 6/2002 | Ludewig | |
| 6,484,663 B2 * | 11/2002 | Zech et al. | 116/284 |
| 6,520,654 B2 | 2/2003 | Angell et al. | |
| 6,717,376 B2 | 4/2004 | Lys et al. | |
| 6,754,139 B2 | 6/2004 | Herbstman et al. | |
| 6,853,162 B2 | 2/2005 | Betts et al. | |
| 6,864,930 B2 | 3/2005 | Matsushita et al. | |
| 7,066,630 B1 * | 6/2006 | Venkatram | 362/489 |
| 7,233,310 B2 | 6/2007 | Lazaridis et al. | |
| 2002/0174733 A1 * | 11/2002 | Rothermel | 73/866.3 |
| 2004/0085746 A1 | 5/2004 | Chen | |
| 2004/0201793 A1 | 10/2004 | Anandan et al. | |
| 2005/0063194 A1 | 3/2005 | Lys et al. | |
| 2005/0139143 A1 * | 6/2005 | Dinh et al. | 116/284 |
| 2006/0012971 A1 | 1/2006 | Fong et al. | |
| 2006/0044778 A1 * | 3/2006 | Muramatsu | 362/23 |
| 2006/0219155 A1 * | 10/2006 | Honma et al. | 116/288 |

FOREIGN PATENT DOCUMENTS

| | | |
|---|---|---|
| EP | 0 475 281 A2 | 3/1992 |
| EP | 0 562 332 | 3/1993 |
| JP | 01260391 A | 10/1989 |
| JP | 02174570 A | 7/1990 |
| JP | 03200072 A | 9/1991 |
| JP | 06230158 A | 8/1994 |
| JP | 06230159 A | 8/1994 |
| JP | 2003-14508 A * | 1/2003 |

* cited by examiner

VEHICLE GAUGE WITH EMBEDDED DRIVER INFORMATION

CROSS-REFERENCE TO RELATED APPLICATIONS

This application claims the benefit of U.S. Provisional Patent Application Ser. No. 60/587,539 entitled "Vehicle Gauge With Embedded Driver Information" filed Jul. 13, 2004.

INTRODUCTION

The present invention generally relates to vehicle instrumentation and more particularly to an analog vehicle gauge with a rotary pointer and a central display.

Traditionally, analog vehicle gauges have employed an arrangement of light guides, reflectors and light bulbs or LEDs. These traditional analog gauges typically employ a moveable pointer that is rotatably coupled to the output shaft of a motor, such as a stepper motor or an aircore movement. One characteristic of this traditional arrangement concerns the area located inwardly of the gauge's scale or indicia. More specifically, this area can at times be rather inefficiently or ineffectively utilized and thereby detract from styling or functionality.

One proposal that we have considered for improving the efficiency and/or effectiveness of an analog vehicle gauge has been to place an information display within the interior of the dial face of the gauge. Construction of the analog vehicle gauge in this manner, however, necessitates reconfiguration of the pointer and potentially the drive system for the movement of the pointer.

One suitable pointer is a Z-shaped pointer such as that which is illustrated in FIG. 1. The pointer, however, has a relatively complex shape that is more costly to produce, can be difficult to backlight and has a relatively large mass. The relatively large mass of the pointer provides the pointer with correspondingly large angular momentum and inertia characteristics. Regarding the inertia of such pointers, those of ordinary skill in the art will appreciate that a pointer with a relatively large inertia requires a motor with a relatively high dynamic torque. Since the torque of a motor and its size tend to be directly related, and since larger motors are typically more costly and difficult to package within an instrument cluster, pointers having a relatively large mass can be less desirable in many situations.

Another suitable pointer is described in U.S. Pat. No. 6,408,783 to Ludewig. This configuration utilizes a disk pointer having a light source mounted thereon. A flexible circuit is attached to the disk pointer and couples the light source to a source of electrical power. The flexible circuit adds complexity and cost to the analog vehicle gauge as well as reduces reliability.

SUMMARY

In one form, the present teachings provide a gauge having a housing, a light source disposed in the housing, a bezel, a display and a pointer. The display is coupled to the housing and includes a display surface that is visible through an opening in the bezel. The display is spaced rearwardly of the bezel to define a light transmitting aperture. The pointer is movably mounted to the housing and includes a pointer end that is disposed on a side of the bezel opposite the light transmitting aperture. A first portion of the light produced by the light source can be employed to back-illuminate the display surface, while a second portion of the light produced by the light source can be collected by the pointer and employed to illuminate the pointer end.

In another form the teachings of the present invention provide a housing, a light source disposed in the housing, a pointer, a display and a motor assembly. The pointer has an annular body, which is rotatably mounted on the housing, and a pointer member that extends outwardly from the annular body. The display is coupled to the housing and has a display surface that is visible through an aperture in the annular body of the pointer. The display is a liquid crystal display, an organic light emitting diode (OLED) display, a polymer light emitting diode display, or a thin film electroluminescent display. The motor assembly has a motor and a drive member that is coupled for rotation with an output member of the motor and which is configured rotate the annular body. The light source illuminates at least the pointer member.

In yet another form the teachings of the present invention provide a method that includes: providing a gauge with a pointer and a display, the pointer having an annular pointer body through which the display is visible; and illuminating a stationary light source to produce light, a first portion of the light being employed to illuminate the pointer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
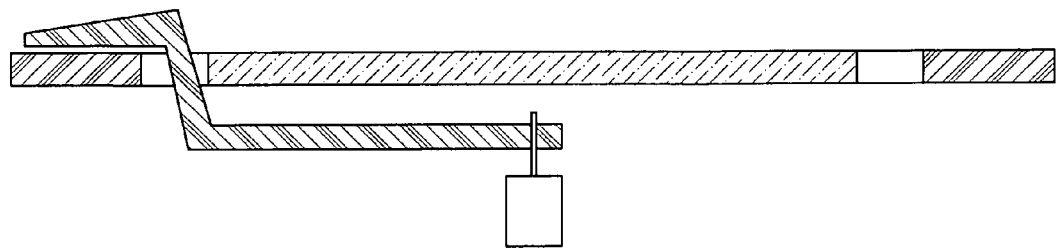
FIG. 1 is a sectional view of an analog vehicle gauge constructed in accordance with the teachings of the present invention.
Figure 2:
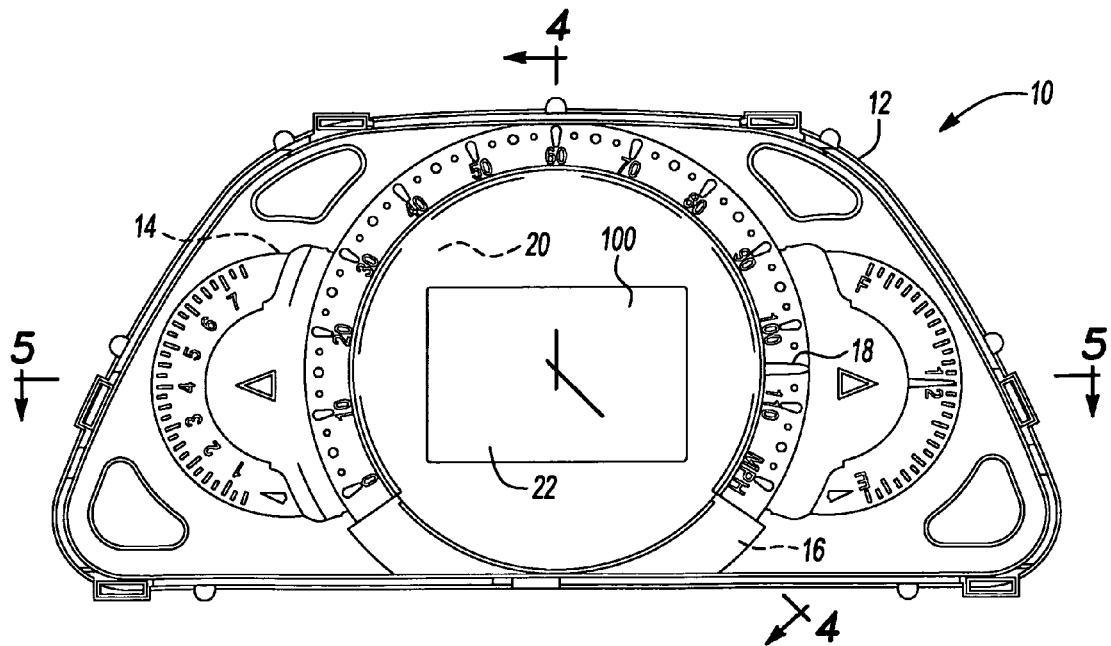
FIG. 2 is a front plan view of an analog vehicle gauge constructed in accordance with the teachings of the present invention.
Figure 3:
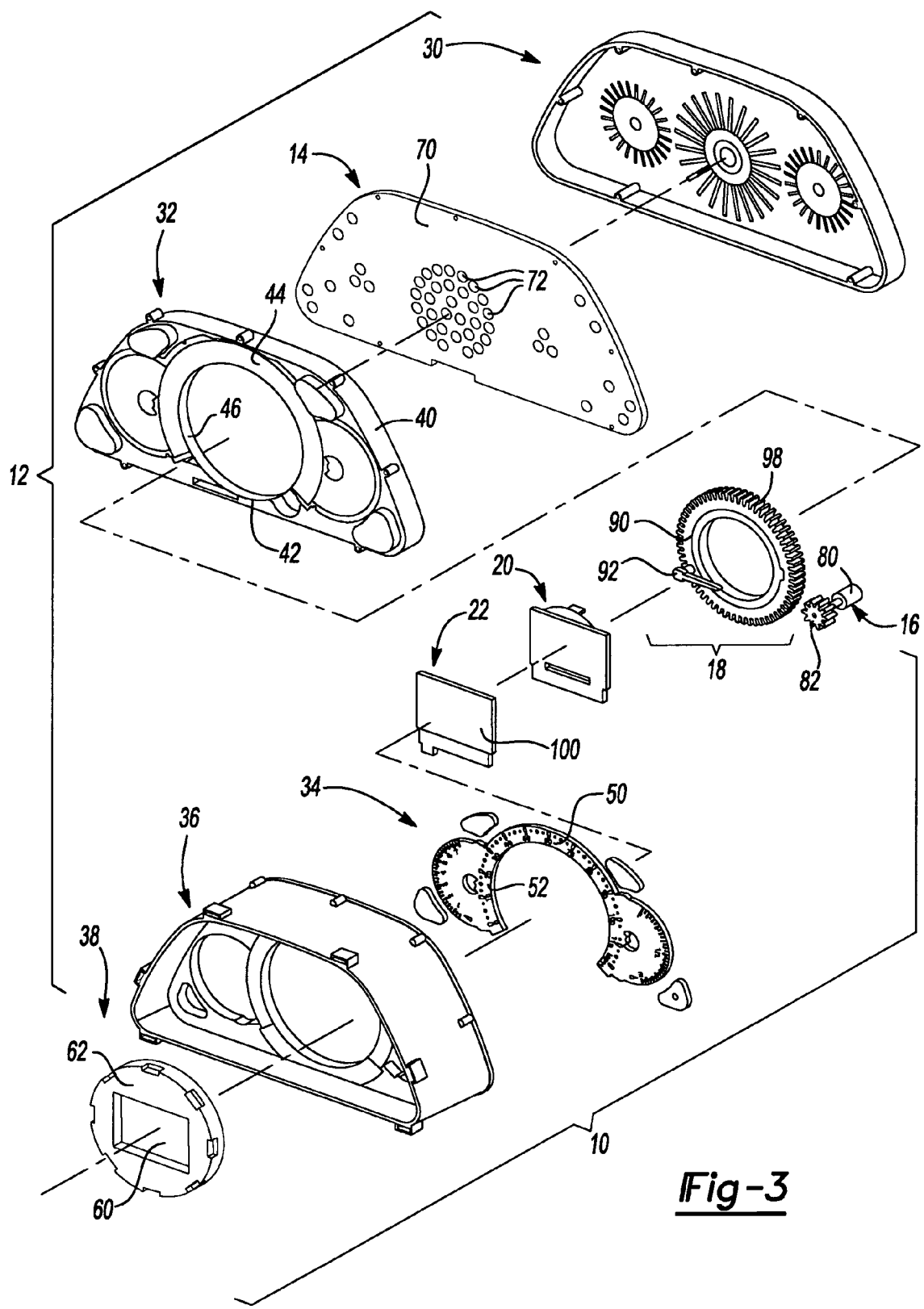
FIG. 3 is an exploded perspective view of the analog vehicle gauge of FIG. 2.
Figure 4:
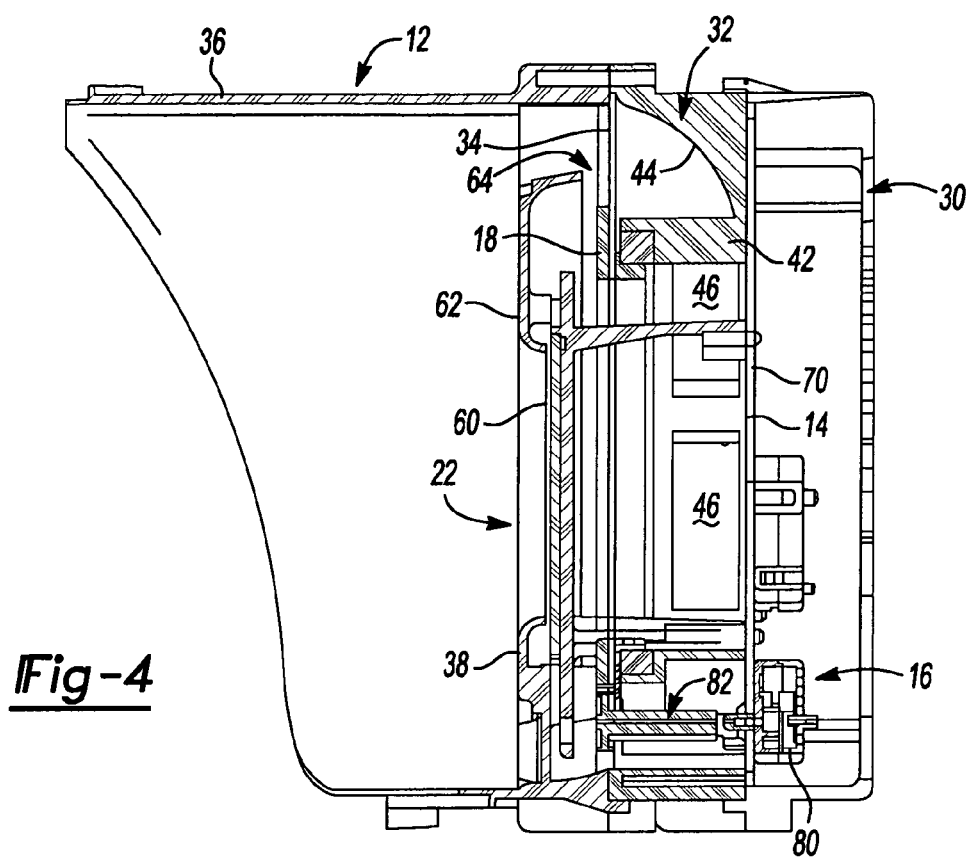
FIG. 4 is a sectional view taken along the line 4-4 of FIG. 2.
Figure 5:
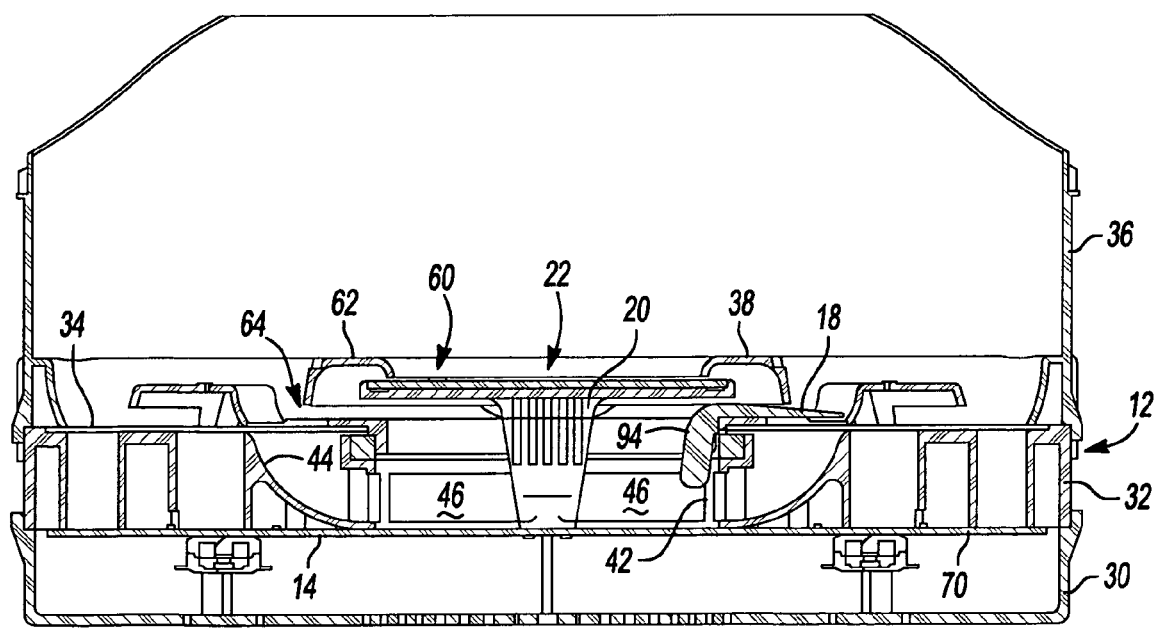
FIG. 5 is a sectional view of a portion of the analog vehicle gauge of FIG. 2 taken along the line 5-5 and illustrating the reflector housing and bezel in more detail.
Figure 6:
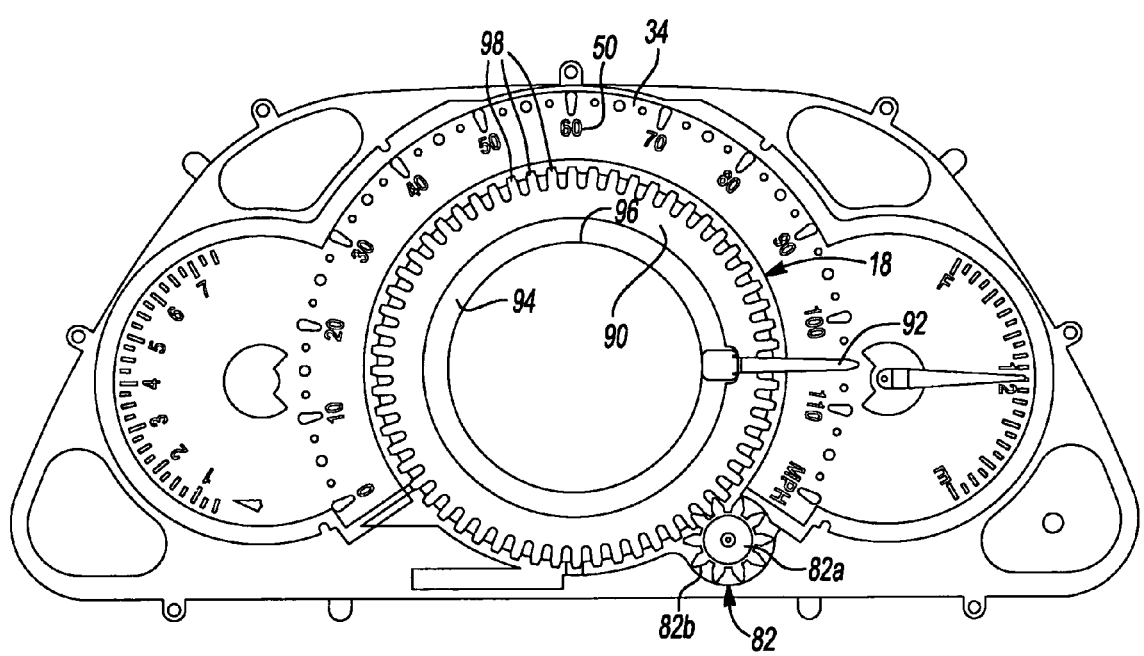
FIG. 6 is a perspective view of a portion of the analog vehicle gauge of FIG. 2 illustrating the reflector housing, the pointer and the circuit board assembly in more detail.

With reference to FIGS. 2 through 4 of the drawings, an analog vehicle gauge constructed in accordance with the teachings of the present invention is generally indicated by reference numeral 10. The gauge 10 can include a housing 12, a circuit board assembly 14, a motor assembly 16, a pointer 18, a light guide 20 and a display 22.

The housing 12 can include a rear housing 30, a reflector housing 32, an appliqué 34, a front mask 36 and a bezel 38. The rear housing 30 can cooperate with the reflector housing 32 to define a cavity in which the circuit board assembly 14 may be housed.

The reflector housing 32 can have housing body 40, which can include a sleeve 42 and a reflector member 44 that can extend about a portion of the sleeve 42. The sleeve 42 can be tubular structure that extends forwardly from an adjacent portion of the housing body 40. A plurality of windows 46 can be formed through the sleeve 42 to interconnect the space that is bounded by the reflector member 44 with the interior of the sleeve 42. The reflector housing 32 can be formed of an opaque and reflective material, such as a white colored plastic.

The appliqué 34 can be configured to overlie the reflector housing 32 and can include a plurality of dial face indicia 50 that are disposed over the reflector member 44 and which surround a portion of the perimeter of the sleeve 42. The dial face indicia 50 can be translucent and surrounded by an opaque background 52, or can be opaque and surrounded by a generally translucent background depending on the styling of the gauge 10 that is desired.

The front mask 36 can be configured to be coupled to the reflector housing 32 and can fixedly secure the appliqué 34 in place between reflector housing 32 and the front mask 36. The front mask 36 can be formed of an opaque material.

The front cover or bezel 38 can include a transparent display aperture 60 and an opaque bezel background 62 that can be disposed about the transparent display aperture 60. The bezel 38 can be coupled to the front mask 36 in a manner that spaces bezel background 62 axially apart from the sleeve 42 of the reflector housing 32 such that a light transmitting aperture 64 is defined therebetween.

The circuit board assembly 14 can include a board member 70, which can abut the rearward side of the sleeve 42, and a light source 72, such as a plurality of light emitting diodes, that can be mounded on the board member 70 and selectively illuminated. The board member 70 can be configured such that the light source 72 is disposed within the sleeve 42 and positioned so that a portion of the light that is produced may be transmitted through the windows 46.

Figure 7:
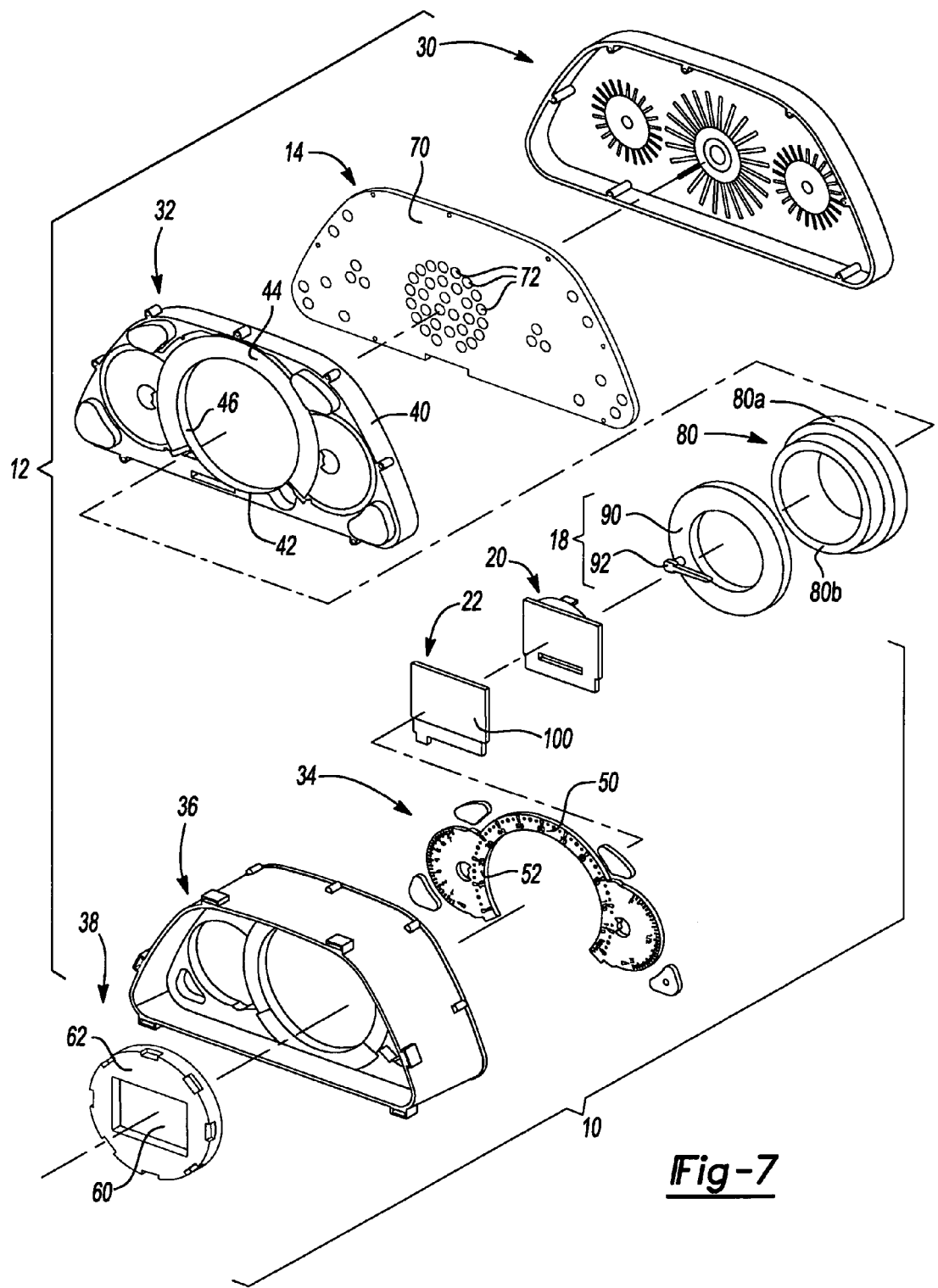
FIG. 7 is an exploded perspective view of another analog vehicle gauge constructed in accordance with the teachings of the present invention.

The motor assembly 16 can include a motor 80, which can be a stepper motor, a DC motor with a position sensor (e.g., an absolute position sensor) or an ultrasonic motor, and an optional output member 82 that can be driven by the motor 80. In the example provided, the output member 82 is a pinion 82a having a plurality of pinion teeth 82b, but in the alternative, the output member 82 could be a sprocket or a pulley of the type that is used with a toothed belt (e.g., timing belt). In the example of FIG. 7, the motor 80 is a hollow ultrasonic motor and the pointer 18 is coupled directly thereto (i.e., the pointer 18 is directly driven by the ultrasonic motor).

The pointer 18 can have an annular pointer body 90, a pointer member 92 and a pointer light guide 94. The pointer body 90 can define a pointer aperture 96 and a plurality of teeth 98 can be formed about at least a portion a perimeter of pointer body 90. The pointer body 90 can be supported for rotation on the sleeve 42 and the teeth 98 can be meshingly engaged to the pinion teeth 82b of the pinion 82a. Accordingly, the motor assembly 16 can be employed to rotate the pointer body 90 about the sleeve 42. The pointer member 92 can be coupled to the pointer body 90 and can extend forwardly and outwardly therefrom so as to be positioned proximate the dial face indicia 50 on the appliqué 34. The pointer light guide 94 can be coupled to the pointer body 90 and can extend through the light transmitting aperture 64 into the interior of the sleeve 42. Accordingly, a portion of the light generated by the light source 72 can be gathered by the pointer light guide 94, directed through the pointer body 90 and into the pointer member 92 so that the pointer member 92 may be illuminated without incorporating a light source into the pointer member 92.

The light guide 20 can be coupled to the housing 12 and can be located within the interior of the sleeve 42. The light guide 20 can be formed of a light-conducting material, such as clear plastic, and can abut the display 22 so that light can be transmitted to through the light guide 20 to the display 22.

In the particular example provided, the display 22 is a liquid crystal display (LCD). The display 22 can be coupled to the light guide 20 and can have a display surface 100, which can be generally aligned to both the display aperture 60 in the bezel 38 and the pointer light guide 94. Accordingly, a portion of the light produced by the light source 72 can be employed to back-light the display 22. One of ordinary skill in the art will appreciate that the display 22 need not be an LCD but could alternatively be another type of display that may or may not require back-lighting. Examples of displays not requiring back-lighting include organic light emitting diode (OLED) displays, polymer light emitting diode displays, and thin film electroluminescent displays.

In operation, light produced by the light source 72 can be employed to illuminate the dial face indicia 50 and the pointer member 92 and to back-light the display surface 100 of the display 22. It will be appreciated, however, that the invention, in its broadest aspects, may be configured somewhat differently. As noted above, for example, a self-illuminating display device may be substituted for the LCD display 22 and in which case, the light source 72 need not be employed to illuminate the display surface 100. As another example, the appliqué 34 can be configured to abut the forward surface of the reflector member 44, in which case light exiting the sleeve 42 through the windows 46 will directly illuminate (as opposed to back-illuminate) the dial face indicia 50.

Those of ordinary skill in the art will appreciate that any type of bearing may be optionally employed to reduce friction between the sleeve 42 and the pointer 18. The bearing could be a journal bearing that is formed of a self-lubricating material or an "anti-friction" bearing having inner and outer bearing races between which is disposed a plurality of elements such as balls or rollers. If a journal bearing is selected, the journal bearing could be formed as a cylindrical sleeve that is disposed between the sleeve 42 and the pointer 18, or could be formed with one or more displacement limiting features configured to inhibit relative axial movement between the pointer 18 and the sleeve 42. One example of a displacement limiting feature is a ring-shaped protrusion that is formed about the circumference of one of the sleeve 42 and the pointer 18 and a corresponding groove that is formed in the other one of the sleeve 42 and the pointer 18. Configuration in this manner permits the pointer 18 to be snap-fit to the sleeve 42. Those of ordinary skill in the art will appreciate from this disclosure that the journal bearing can be a discrete component that can be separately formed and subsequently assembled to one of the sleeve 42 and the pointer 18, or could be formed onto the one of the sleeve 42 and the pointer 18 in an appropriate manner (e.g., overmolding).

The example of FIG. 7 is generally similar to the example of FIG. 2, except that the motor 80 is a hollow ultrasonic motor 80a and the pointer 18 is directly coupled to an output portion 80b of the ultrasonic motor 80a. Configuration of the vehicle gauge in this manner is advantageous due to the relatively high torque that is output by the ultrasonic motor 80a, the relatively high holding torque that is provided by the ultrasonic motor 80a, the reduction of noise, the elimination of magnetic interference and simplification of the analog vehicle gauge including the motor 80 and the pointer 18. A suitable ultrasonic motor may be purchased from Polytec PI of Auburn, Mass. The use of non-hollow ultrasonic motors in vehicle gauges is discussed in U.S. Pat. No. 5,201,277 entitled "Display Apparatus For Vehicle" issued Apr. 13, 1993, the disclosure of which is hereby incorporated by reference as if set forth herein in its entirety.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A gauge comprising:
  a housing that includes a sleeve;
  a plurality of light sources disposed in the housing and producing light;
  a bezel coupled to the housing to define a light transmitting aperture, the bezel having a opening;
  a display coupled to the housing, the display having a display surface that is visible through the opening, the display being spaced rearwardly of at least a portion of the bezel;
  a pointer moveably mounted to the housing, the pointer having a pointer end, which is disposed on a side of the bezel opposite the light transmitting aperture, an annular pointer body that includes a plurality of teeth formed about a perimeter of the body, the annular pointer body rotatably supported on the sleeve and a light guide that extends through the light transmitting aperture and the sleeve;
  a face coupled to at least one of the housing, the bezel and the display, the face including dial face indicia that are disposed about the sleeve; and
  a motor assembly coupled to the housing, the motor assembly having a drive member that meshingly engages the plurality of teeth of the pointer body,
  wherein a first portion of the light produced by the plurality of light sources back-illuminates the display surface; and
  wherein a second portion of the light produced by the plurality of light sources is collected by the light guide and illuminates the pointer end.

2. The gauge of claim 1, further comprising display indicia disposed about a perimeter of the opening and wherein a third portion of the light produced by the plurality of light sources escapes through windows and illuminates the display indicia.

3. The gauge of claim 2, wherein the display indicia is back-illuminated.

4. The gauge of claim 3, wherein the light guide is generally L-shaped.

5. The gauge of claim 1, wherein the pointer body is disposed between the light guide and the pointer end.

6. The gauge of claim 1, wherein the display is an LCD display.

7. The gauge of claim 1, further comprising a light guide coupled to the display and disposed between the display and the plurality of light sources, the light guide being configured to direct light from the plurality of light sources into the display.

8. The gauge of claim 1, further comprising an ultrasonic motor coupled to the housing and the pointer, the ultrasonic motor being configured to move the pointer.

9. The gauge of claim 8, wherein the ultrasonic motor is hollow.

10. The gauge of claim 9, wherein the pointer is directly coupled to the ultrasonic motor.

11. A gauge comprising:
  a housing that includes a sleeve;
  a plurality of light sources disposed in the housing and producing light;
  a bezel coupled to the housing to define a light transmitting aperture;
  a pointer having an annular body and a pointer member that extends outwardly from the annular body, the annular body being rotatably mounted on the sleeve, the pointer member including a pointer end disposed on a side of the bezel opposite the light transmitting aperture and a light guide that extends through the light transmitting aperture and the sleeve;
  a display coupled to the housing, the display having a display surface that is disposed in-line with an aperture in the annular body of the pointer so that the pointer member is movable about at least a portion of the display surface during operation of the gauge;
  a face coupled to at least one of the housing, the bezel and the display, the face including dial face indicia that are disposed about the sleeve; and
  a motor assembly having a motor and a drive member that is coupled for rotation with an output member of the motor, the drive member being configured rotate the annular body,
  wherein the plurality of light sources illuminates at least the pointer member and wherein the display is selected from a group consisting of liquid crystal displays, organic light emitting diode (OLED) displays, polymer light emitting diode displays, and thin film electroluminescent displays.

12. The gauge of claim 11, wherein the display is a liquid crystal display and a portion of the light produced by the plurality of light sources back-illuminates the display surface.

13. The gauge of claim 11, wherein at least a portion of a perimeter of the annular body is formed with a plurality of teeth and wherein the drive member has a plurality of similarly teeth formed teeth.

14. The gauge of claim 13, wherein the teeth of the drive member are meshingly engaged with the teeth of the annular body.

15. The gauge of claim 11, wherein the bezel has an opening through which the display is visible, the display being spaced rearwardly of at least a portion of the bezel to define the light transmitting aperture, wherein a portion of the light produced by the plurality of light sources escapes from the light transmitting aperture and illuminates a display indicia disposed about a perimeter of the opening.

16. A method of illuminating a gauge comprising:

providing a gauge with a pointer and a display, the pointer having an annular pointer body rotatably coupled on a sleeve of a housing, the pointer including a light guide that extends through the sleeve, the display being disposed in-line with the sleeve so that a pointer member associated with the pointer is movable about at least a portion of the display during operation of the gauge; and illuminating a plurality of stationary light sources to produce light, a first portion of the light being directed into the light guide and through the annular pointer body to illuminate the pointer and a second portion of the light being employed to back-illuminate the display.

17. The method of claim 16, wherein the display is an LCD display.

18. The method of claim 16, further comprising:

providing a motor assembly having an output member;

meshingly engaging the output member to an edge of the annular pointer body; and rotating the output member to move the annular pointer body.

* * * * *